United States Patent [19]

Ozari et al.

[11] 4,448,932
[45] May 15, 1984

[54] POLYVINYL CHLORIDE MODIFIED WITH BUTADIENE-CONTAINING CORE-SHELL COMPOSITE POLYMERS FOR ENHANCED IMPACT STRENGTH

[75] Inventors: Yehuda Ozari, Arcadia, Calif.; Suzanne B. Nelsen, Bergenfield; Andrew Klein, Somerville, both of N.J.

[73] Assignee: GAF Corporation, New York, N.Y.

[21] Appl. No.: 414,168

[22] Filed: Sep. 2, 1982

Related U.S. Application Data

[63] Continuation-in-part of Ser. No. 141,513, Apr. 18, 1980, abandoned, and Ser. No. 119,606, Feb. 8, 1980, abandoned.

[51] Int. Cl.$^3$ .................. C08L 33/02; C08L 51/04
[52] U.S. Cl. ........................................ 525/78; 525/80; 525/83; 525/84; 525/85; 525/86; 525/261
[58] Field of Search ............ 525/78, 80, 83, 84, 525/85, 261, 86

[56]  References Cited

U.S. PATENT DOCUMENTS

| | | | |
|---|---|---|---|
| 3,163,683 | 12/1964 | Szlyer et al. | 525/233 |
| 3,644,249 | 2/1972 | Ide et al. | 525/78 |
| 3,652,727 | 3/1972 | Yonezu et al. | 525/78 |
| 3,657,390 | 4/1972 | Tanaka et al. | 525/77 |
| 4,078,018 | 3/1978 | Chauvel et al. | 525/83 |

Primary Examiner—J. Ziegler
Attorney, Agent, or Firm—Marilyn J. Maue; J. Gary Mohr; Joshua J. Ward

[57]  ABSTRACT

This invention relates to a polyvinyl chloride resin composition containing said resin and a significant amount of a polymer of butadiene in the form of a shell-core polymer wherein a polymer of methylmethacrylate forms said shell and completely encapsulates the core containing the butadiene polymer.

16 Claims, No Drawings

POLYVINYL CHLORIDE MODIFIED WITH BUTADIENE-CONTAINING CORE-SHELL COMPOSITE POLYMERS FOR ENHANCED IMPACT STRENGTH

CROSS-REFERENCE TO RELATED APPLICATION

This is a continuation-in-part of our application Ser. Nos. 119,606, filed on Feb. 8, 1980, and 141,513 filed Apr. 18, 1980, both bearing the same title as this application both abandoned.

FIELD OF THE INVENTION

This invention relates to impact modification of polyvinyl chloride. More particularly, this invention relates to polyvinyl chloride compositions exhibiting enhanced impact strength due to the incorporation therein of certain core/shell composite polymers which are compatible and more readily incorporated with polyvinyl chloride.

BACKGROUND OF THE INVENTION

In order to be useful for molding and other industrial purposes, rigid plastics such as polyvinyl chloride are generally reinforced with particles of rubbery polymers, such as polybutadiene, polyacrylates, copolymers of butadiene and styrene, etc. The addition of rubbery polymers to polyvinyl chloride improves its impact strength, i.e. the ability to withstand a rapidly applied shock. However, the addition of such rubbery materials often adversely affects physical properties such as tensile strength, clarity, heat distortion temperature, hardness, aging stability, color fastness, etc. Furthermore, the addition of larger amounts of rubbery materials, which would produce a product of maximum impact strength would result in a modified polyvinyl chloride which is too soft for many uses. In commercial practice, the modified polyvinyl chlorides represent a compromise between the desire to increase the impact strength and the maintenance of other required physical properties.

Among the rubbery materials commonly in use to modify polyvinyl chloride are polybutadiene and copolymers of styrene and butadiene. Because of processing difficulties, pure polybutadiene can be used in only relatively small amounts, and the small amounts have generally not been sufficient to provide the desired improvement in impact strength. SBR* has shown some effectiveness, the particular properties of SBR-modified polyvinyl chloride depending in large measure upon the relative amounts of styrene and butadiene, but these also have presented processing difficulties and have detracted from the other desired physical properties of polyvinyl chloride. In particular, the incorporation of significant amounts of SBR into polyvinyl chloride has resulted in significantly lower heat stability and weatherability. Notwithstanding these drawbacks polybutadiene and SBR have been used because of their availability and low cost.
*styrene/butadiene rubber To overcome the difficulty of incorporating polybutadiene into polyvinyl chloride, the use of styrene and/or methylmethacrylate grafted on SBR-butyl acrylate or SBR resins has been proposed in U.S. Pat. Nos. 3,644,249 and 3,657,390. However grafted side chains, intermittently distributed along the elastomer polymer backbone lack the degree of efficiency desired. In the graft polymer, individual segments e.g. polybutadiene segments, are subject to attack by solvents and are sensitive to light. The final finishing step in forming the polymers disclosed in U.S. Pat. No. 3,644,249 is grafting with polystyrene which is not compatible with polyvinyl chloride but which rises to the surface of the polymer particles to improve gloss.

Accordingly, it is a principal object of this invention to provide a modified polymeric composition, based on butadiene or SBR, which, when mixed with a polyvinyl chloride resin composition, would yield a product with enhanced impact strength and compatibility.

Another object of this invention is to provide efficient use of methylmethacrylate in obviating incompatibility of polybutadiene in polyvinyl chloride when incorporation of these polymers is desired.

Another object of this invention is to obtain a polyvinyl chloride composition with enhanced impact strength, but without the deterioration in physical properties which have heretofore resulted from the use of polybutadiene or SBR.

Yet another object of this invention is to develop a modifier for polyvinyl chloride which can be in a form (for example, powder or flakes) which can be easily blended into a polyvinyl chloride resin.

SUMMARY OF THE INVENTION

A polyvinyl chloride of improved impact strength is obtained by incorporating into a polyvinyl chloride resin composition from about 5 to about 40 parts per weight of a core-shell composite polymer of butadiene and methylmethacrylate. The core-shell composite polymer is produced from discrete particles of either (i) polybutadiene, (ii) a copolymer of butadiene and styrene or (iii) a terpolymer of butadiene, styrene and from about 2 to about 12 weight percent of an alkyl methacrylate in which the alkyl has from 1 to 18 carbon atoms, as the core polymer. The core polymer is placed in an aqueous emulsion containing a fast acting wetting agent to which is added, as a shell-forming monomer, methylmethacrylate in an amount sufficient to form, on polymerization, a substantially complete shell around the core polymer. On polymerization, the polymer core particles are substantially completely encased by an integral shell of polymerized methylmethacrylate. The unique structure of these particles results in their complete compatibility with polyvinyl chloride and permits one to use them in a modified polyvinyl chloride composition having enhanced impact strength, yet suffering from none of the disadvantages of polyvinyl chlorides in which large amounts of rubbery polymers have been incorporated.

DETAILED DISCLOSURE

It is of critical importance in the practice of this invention that the core-shell composite polymers be true core-shell polymer compositions, i.e., the core must comprise a polymeric substance of the type discussed above—i.e. polybutadiene, a copolymer of styrene and butadiene, or a terpolymer or styrene, butadiene and an alkyl methacrylate—and the shell must be formed integrally with and substantially completely encasing the core.

The core polymer is a butadiene polymer—either a homopolymer of butadiene, a copolymer of styrene and butadiene, or, preferably, a terpolymer of styrene, butadiene and from 2 to 12 weight percent of an alkyl methacrylate. Although not considered necessary, it is further preferred that the polymer core contain up to about 10% by weight of a stabilizing polymerized unsaturated organic acid containing from 3 to 5 carbon atoms such as, for example, itaconic, methacrylic or fumaric acid. Most preferably, the acid stabilizer will be present in an amount ranging from about 2 to about 4 percent by weight of the polymer. Polymers of these types are well known in the art and can be prepared according to known processes.

If a copolymer containing styrene and butadiene or a terpolymer of styrene, butadiene and alkyl methacrylate is employed as the core material, it is preferably that the butadiene be present in at least about 45 weight percent, more preferably at least 70 weight percent, of the polymer core. The polymer core may also contain other monomers, in small amounts, which are known to be compatible with butadiene for incorporation into polyvinyl chloride compositions.

If the polymer core is the preferable terpolymer of butadiene, styrene, and an alkyl methacrylate, it is further preferred that the alkyl methacrylate be present in an amount ranging from about 4 to about 10% by weight. The preferred alkyl methacrylate is methylmethacrylate. Further information about these termonomer compositions may be found in co-pending application Ser. No. 059,673, filed July 23, 1979, now abandoned, pertinent portions of which are incorporated herein by reference.

The shell of the composite polymer comprises methylmethacrylate, to which has been optionally added a small amount up to about 1 percent by weight of a cross-linking agent such as allyl methacrylate. The shell should comprise from about 10 to about 60 weight percent, preferably from 20 to 40 weight percent, of the composite polymer.

As noted above, one of the conditions for the practice of this invention is that the shell layer substantially completely cover the core polymer thus presenting an outer surface of methylmethacrylate homopolymer. The thickness of the shell layer necessarily will vary depending on a number of conditions, including the composition of the core, the diameter of the core, the conditions of polymerization such as the effectiveness of the wetting agent and the stability of the core in forming a discrete particle. If the core is not substantially completely covered by the shell polymer, the polymer will exhibit properties more akin to a random copolymer of the monomers forming the core and shell materials or the grafted open chain polymers heretofore employed than the true core-shell composite polymer required in the compositions of this invention. No firm figures for the actual amount of shell-forming monomer required in any particular case can be given, but these can be easily determined without undue experimentation. For example, it has been found that SBR core particles of 0.1 to 0.2 micron diameter theoretically can be covered with shell film of polymethyl methacrylate, the point of shell composition—i.e. where the shell completely covers the core—at about 23 weight percent of shell material. Particles of larger diameter require higher amounts of shell material.

The discrete composite particles used in the practice of this invention are formed by emulsion polymerization which employs a fast acting wetting agent, e.g. diisopropyl sulfosuccinate having a wetting capability of 5/100th of 1%-1 second Draves sinking time. Other fast acting wetting agents include sodium or potassium salts of dioctyl-, di-hexyl- and diisobutyl-sulfosuccinates. In the present invention, the role of the surfactant is to stabilize the core polymer and is employed in an amount commensurate with this function but insufficient to promote the formation of independent, discrete polymethylmethacrylate particles, the formation of which in substantial amount lowers impact strength. Thus, for the purposes of the present invention, a highly active surfactant, permitting shorter contact time, is employed. The products of this polymerization are obtained as discrete layered particles in an aqueous medium, and can be dried and then redispersed in water, a polar solvent such as dimethyl formamide, or can be directly incorporated into polyvinyl chloride resins. The shells are integral with the cores, with the polymer chains of the shell being interlocked with those of the core either mechanically or, when methylmethacrylate terpolymer is present, by chemical bonding. It should be emphasized, however, that the core and shell portions of the composite polymer maintain their identities even after incorporation into the polyvinyl chloride resin composition.

The method for preparing the core-shell composite polymers comprises providing a suitable emulsion of discrete particles of the core polymer, adding to the emulsion, as a shell-forming monomer, methylmethacrylate, and polymerizing the methylmethacrylate to form an outer shell layer on the core. The processes for polymerization of methylmethacrylate are well known in the art.

The surface shell of the composite polymer is completely compatible with polyvinyl chloride and polyvinyl chloride-plasticizer mixtures and since no surface exposure of polybutadiene is present, the composite enables a relatively large amount of encapsulated polybutadiene to be incorporated in the polyvinyl chloride with a minimal amount of methylmethacrylate which forms only as a thin film layer or thicker coating. As stated herein, the grafted side chains intermittently distributed along the polymer backbone as in the polymers of the prior art, are less efficient than the present core-shell polymers. Specifically the grafted polymers of U.S. Pat. No. 3,644,249 employ 50 wt. % graft of which a substantial amount is comprised of the relatively expensive methylmethacrylate monomer. By employing the shell-core polymer of the present invention only 23 wt. % of the methylmethacrylate is needed to encapsulate the styrene/butadiene or terpolymer core. Between about 25-35 wt. % shell polymer based on the composite is optimum and at levels higher than 40 wt. %, the impact properties of the polyvinyl chloride modified with these polymers begins to fall off. The present core-shell polymer also possesses outstanding transparency, clarity and light carrying properties. Unlike the final polystyrene graft used in U.S. Pat. No. 3,644,249, the present polymethyl methacrylate shell has good shock resistance and also possesses outstanding ultraviolet resistance. The methylmethacrylate shell of the present polymer composite, which completely encapsulates the butadiene polymer, filters out at least a substantial portion of light which ordinarily tends to degrade polybutadiene. The shell also acts as a shield against substances to which it is inert, but which normally attack polybutadiene, such as certain solvents. These benefits are not realized by the graft polymers of the art where polybutadiene segments are necessarily exposed on the composite surface. Moreover, the exposed polymethyl methacrylate surface herein described is compatible with plasticizers often employed with polyvinyl chloride to reduce brittleness and has significantly better solvent resistance than polystyrene. Still another advantage of the present polymer structure is that the methylmethacrylate homopolymer needed for incorporation with polyvinyl chloride is not ineffectively trapped in the core portion of the composite shell-core structure; whereas coiling of the grafted polymers containing polymethyl methacrylate along the active sites of the entire polymer backbone chain would necessarily contain homopolymethyl methacrylate in the axis area of the coiled chain.

The exposed surface of these grafted polymers inherently possess characteristics of both the grafted moieties and the elastomer in a modified relationship dependent on the degree of grafting as opposed to the exposed surface of the present polymer particles which provides unmodified properties of the polymethyl methacrylate shell.

The shell is usually not of uniform thickness throughout, and this is due to the method in which it forms. Typically, the shell material begins polymerizing by precipitation on a localized point in the surface of the core. The surface area covered continues to grow as polymerization proceeds through deposition of the shell material over the entire surface of the core. In this manner, the first formed areas of the shell may be thick and the later formed areas thinner. Thus, the polymer composite particles are not likely to be spherical in shape, but this does not detract from their usefulness in the polyvinyl chloride resin compositions of this invention.

Further details concerning the formation of core-shell composite polymers can be found in co-pending application (Ser. No. 115,824) filed Jan. 28, 1980, now abandoned, pertinent portions of which are incorporated herein by reference.

There may also be included, as an option, a "barrier" layer of acrylonitrile between the polymer core and the polymerized shell. The presence of this barrier layer appears to provide for increased impact strength when the amount of shell-forming material in the composite polymer is low, i.e. 25 wt. % or less. If a barrier layer is to be provided, it is effected as an additional step prior to the step of adding the shell-forming monomer. Acrylonitrile, in an amount ranging from about 0.1 to about 2.0 weight percent based on the weight of the core polymer, is added to the emulsion and allowed to polymerize to form the barrier layer. The conditions of this polymerization reaction are similar to well-known methods of polymerizing acrylonitrile. Other suitable barriers include the polymers of acrylic monomers such as 2-cyanoethyl acrylate.

The core-shell composite polymers are generally obtained in powder or flake form and are blended into polyvinyl chloride resins by mixing, milling or by other conventional procedures. The amount of composite polymer in the polyvinyl chloride resin composition of this invention ranges from about 5 to about 40 parts by weight, preferably from 5 to 20 parts by weight. The polyvinyl chloride compositions modified by the presence of these composite polymer particles are tough, rigid, thermoplastic, chemically resistant materials having high impact strength, high heat distortion temperatures, and other desirable properties of polyvinyl chloride.

The following examples are presented for the purpose of illustrating and explaining the present invention, and are not to be taken as limiting in any regard. Unless otherwise indicated, all parts and percentages are given by weight.

EXAMPLE I

This example describes the preparation of a core-shell composite polymer suitable for use as a polyvinyl chloride modifier to prepare compositions according to this invention. The core is prepared of a styrene-butadiene-itaconic acid random polymer, and the shell is prepared by polymerizing methyl methacrylate monomer over the core dispersed in water with sufficient surfactant to maintain dispersion without increase in the number of particles.

To prepare the core emulsion, the following materials are sequentially charged into a one gallon high pressure ketttle equipped with a mechanical stirrer, thermometer, pressure gauge and three charging inlets:

| Charge No. | Ingredients | % in $H_2O$ | Weight (g) |
|---|---|---|---|
| A-1 | Water (double distilled) | — | 916.0 |
| | Hampene-100 (EDTA chelating agent) | 38 | 2.2 |
| | Itaconic acid | — | 18.0 |
| | Monawet MB-45 Diisopropyl sodium sulfosuccinate (surfactant) | 45 | 10.7 |
| | SBR Seed latex (0.08M, 20% butadiene) | — | 87.0 |
| A-2 | Water (double distilled) | — | 50.0 |
| | Ammonium persulfate | — | 2.4 |
| B-1 | Styrene | — | 540.0 |
| | Butadiene | — | 615.0 |
| | Methacrylic acid | — | 12.0 |
| | Tertiary dodecyl mercaptan | — | 4.8 |
| B-2 | Water (double distilled) | — | 215.0 |
| | Sodium hydroxide | 20 | 18.0 |
| | Ammonium persulfate | — | 6.0 |
| | Monawet MB-45 Diisopropyl sulfosuccinate (surfactant) | 45 | 10.8 |

These materials are added and processed in the following stagewise procedure:
(1) Charge A-1 is added to the kettle.
(2) The kettle is purged with nitrogen by first evacuating the kettle to 5" vacuum, then breaking the vacuum with nitrogen, and building pressure up to 25 psi. This sequence is repeated twice.
(3) Agitation is started at 300 RPM
(4) Temperature of the contents of the kettle is raised to 82° C. in 20 minutes.
(5) When temperature reaches 82° C., the reaction is started by adding A-2 in one shot, and then
(6) Starting the Charges B-1 and B-2 from two separate inlets.
(7) Addition of B-1 and B-2 is completed in 2 hours; the temperature is then maintained at 82° C. and 110 atmosphere for an additional 2 hours.

To form the shell on the core, the following further materials are added stagewise.

| Charge No. | Ingredients | Weight (g) |
|---|---|---|
| B-3 | Water (double distilled) | 333.8 |
| | Ammonium persulfate | 2.2 |
| B-4 | Methyl methacrylate | 102.0 |

These materials are added and reacted as follows:
(8) Charge B-3 is added in 60 seconds.
(9) Charge B-4 is added in 45 seconds.

(10) Temperature is raised to 88° C. in 10 minutes, and then it is maintained for 1 hour.

(11) The contents of the kettle are cooled to room temperature, and the latex is discharged through a 40 mesh screen.

The resulting product is a true core-shell polymer wherein the center of the SBR core is free of the polymethyl methacrylate shell material.

EXAMPLE II

This example describes the preparation of a core-shell composite in which the core is polybutadiene, and in which there is a barrier layer of polyacrylonitrile.

A two liter, three necked round bottom flask equipped with a mechanical stirrer, reflux condenser, dropping funnel and condenser, was the reaction vessel. The flask was heated by a heating mantel controlled by a thermal watch set at 80° C.

Into the flask was charged 400 grams of a 100% butadiene latex (TSC=53.17) and 569 grams of water (double distilled). The mixture was heated with stirring to a 80° C., and then 0.43 grams of ammonium persulfate in two grams of water was added all at once, followed by 1.4 grams of acrylonitrile over 2 minutes. The temperature was maintained for 15 minutes at 80° C. There then was added a mixture of 144.8 grams of methylmethacrylate, 1.4 grams of allyl methacrylate, and 0.07 grams of Siponate DS-10 at a rate of about 1 milliliter per minute. After addition was complete, the temperature was maintained at 80° C. for one hour. The resultant product was cooled at room temperature with stirring and then dried.

EXAMPLE III

This example described the preparation of a core-shell composite in which the core is a random polymer prepared from styrene, butadiene, stearyl methacrylate and itaconic acid.

The following materials are segmentally charged into a one-gallon high pressure reactor of the type described in Example I:

| Charge No. | Ingredients | % in H$_2$O | Weight (g) |
|---|---|---|---|
| A-1 | Water (distilled) | | 916.0 |
| | Hampene 100 EDTA (chelating agent) | 38 | 2.2 |
| | Itaconic acid | | 12.0 |
| | Monawet MB-45 diisobutyl sodium sulfosuccinate (surfactant) | 45 | 10.7 |
| | SBR Seed latex, (0.08M, 20% butadiene distilled) | 42 | 87.0 |
| A-2 | Water | | 50.0 |
| | Ammonium persulfate | | 2.4 |
| B-1 | Water (distilled) | | 215.0 |
| | Sodium hydroxide | 20 | 18.0 |
| | Ammonium persulfate | | 6.0 |
| | Monawet MB-45 diisobutyl sodium sulfosuccinate (surfactant) | 45 | 10.8 |
| B-2 | Styrene | | 540.0 |
| | Butadiene | | 612.0 |
| | Methacrylic acid | | 12.0 |
| | Stearyl methacrylate | | 24.0 |
| | Tertiary dodecyl mercaptan | | 12.0 |

These materials are added and processed in the following stagewise procedures:

(1) Charge A-1 is added to the kettle.

(2) The kettle is purged with nitrogen by first evacuating the kettle to 5" vacuum, then breaking the vacuum with nitrogen, and building pressure up to 25 psi. This sequence is repeated twice.

(3) Agitation is started at 300 RPM (4) Temperature of the contents of the kettle is raised to 82° C. to 20 minutes.

(5) When temperature reaches 82° C., the reaction is started by adding A-2 in one shot, and then (6) Starting the Charges B-1 and B-2 from two separate inlets.

(7) Addition of B-1 and B-2 is completed in 4 hours, while maintaining temperature at 82° C.

To form the shell on the core, ammonium sulfate in water and methyl methacrylate are added in the amounts set forth in Example I following steps (8) through (11) thereof.

The resulting product is a true core-shell polymer wherein the core of styrene, butadiene and stearyl methacrylate polymer is free of the polymethylmethacrylate shell material. It is suitable for incorporation into polyvinyl chloride, according to this invention.

EXAMPLE IV

This example describes the preparation of a core-shell composite in which the core is a random polymer prepared from styrene, butadiene, methyl methacrylate and itaconic acid. The following materials are sequentially charged into a one gallon high pressure reactor of the type described in Example I:

| Charge No. | Ingredients | % in H$_2$O | Weight (g) |
|---|---|---|---|
| A-1 | Water (distilled) | | 854.4 |
| | Hampene 100 EDTA (chelating agent) | 38 | 2.2 |
| | Itaconic acid | | 12.0 |
| | Monawet MB-45 diisobutyl sodium sulfosuccinate (surfactant) | 45 | 10.7 |
| | Seed latex, (0.08M, 20% butadiene) | 42 | 116.0 |
| A-2 | Water (distilled) | | 50.0 |
| | Ammonium persulfate | | 3.6 |
| | Water (distilled) | | 215.0 |
| | Sodium hydroxide | 20 | 18.0 |
| | Ammonium Persulfate | | 8.4 |
| | Monawet MB-45 diisobutyl sodium sulfosuccinate (surfactant) | 45 | 10.7 |
| B-2 | Styrene | | 540.0 |
| | Butadiene | | 554.4 |
| | Methacrylic acid | | 18.0 |
| | Methyl methacrylate | | 36.0 |
| | Tertiary dodecyl mercaptan | | 7.2 |

These materials are added and processed in the following stagewise procedure:

(1) Charge A-1 is added to the kettle.

(2) The kettle is purged with nitrogen by first evacuating the kettle to 5" vacuum, then breaking the vacuum with nitrogen, and building pressure up to 25 psi. This sequence is repeated twice.

(3) Agitation is started at 300 RPM.

(4) Temperature of the contents of the kettle is raised to 82° C. in 20 minutes.

(5) When temperature reaches 82° C., the reaction is started by adding A-2 in one shot, and then (6) Starting the Charges B-1 and B-2 from two separate inlets.

(7) Addition of B-1 and B-2 is completed in 4 hours, while maintaining temperature at 82° C.

To form the shell on the core, ammonium sulfate in water and methyl methacrylate are added in the amounts set forth in Example I following steps (8) through (11) thereof.

The resulting product is a true core-shell polymer wherein the core of styrene, butadiene and methyl methacrylate polymer is free of the polymethyl methacrylate shell material. It is suitable for incorporation into polyvinyl chloride, according to this invention.

EXAMPLE V

This Example reports the results of incorporating into polyvinyl chloride, core-shell composite polymers in which the polymer core is 100% polybutadiene. The core shell polymer composites were prepared according to the methods illustrated in Examples I and II, and were incorporated into polyvinyl chloride resin in an amount of 12.5 parts per 100 parts of polyvinyl chloride resin. A glazing resin formulation was used. The results are shown in the following Table 1.

The glazing resin formulation includes 100 parts of polyvinyl chloride resin, 3 parts of a thermal stabilized sold under the trademark TM 181 by Cincinnati Milacron, 3 parts of a process aid sold under the Trademark K120 ND by Rohm & Haas, and 0.3, 0.1 and 0.05 parts, respectively, of lubricants sold under the trademarks CAW-3, WE-2 and PA-190 by American Hoechst Company.

Although a glazing formulation was used in the example, the polymers of the invention perform as well in opaque formulations. Opaque formulations have found applications in siding, guttering, etc.

TABLE 1

| | Composition | | | Properties in PVC | | | | |
| | Barrier % | Shell % | | Gardner Impact | | Izod Impact | | |
| Test No. | AN | MMA | AMA | in. lbs/ mil | % Ductile Breaks | in. lbs/ in. notch | HDT °C. | YI |
| --- | --- | --- | --- | --- | --- | --- | --- | --- |
| 1 | 0 | 25 | 0 | 3.7 | 57 | 1.382 | 71.2 | 50.3 |
| 2 | 0 | 40 | 0 | 0.2 | 0 | 0.806 | 72.6 | 63.9 |
| 3 | 2 | 25 | 0 | 4.0 | 100 | 1.376 | 72.4 | 34.0 |
| 4 | 2 | 40 | 0 | 2.8 | 25 | 1.145 | 72.1 | 34.4 |
| 5 | 2 | 50 | 0 | 4.2 | 45 | — | 73.4 | 32.5 |
| 6 | 2 | 50 | 0 | 3.3 | 50 | 0.705 | 72.6 | 17.9 |
| 7 | 0 | 40 | 0 | 3.5 | 71 | 0.907 | 71.8 | 30.0 |
| 8 | 2 | 40 | 0 | 2.7 | 0 | — | 73.0 | 53.3 |
| 9 | 0 | 25 | 1 | 3.9 | 100 | 2.073 | 72.0 | 23.9 |
| 10 | 2 | 25 | 1 | 3.5 | 67 | 1.064 | 71.2 | 63.9 |
| Unmodified PVC Control | | | | 0.9 | 0 | 0.476 | 71.0 | 7.4 |

Abbreviations:
AN = acrylonitrile
MMA = methyl methacrylate
AMA = allyl methacrylate
HDT = heat distortion temperature
YI = yellowing index

EXAMPLE VI

This example illustrates the use of core-shell composite polymers in which the polymer core contains 70% butadiene and 30% styrene. The composite polymers were incorporated into polyvinyl chloride resin of the type employed in Example V and in the same amount. The results are shown in the following Table 2.

TABLE 2

| | Composition | | Properties in PVC | | | | |
| | Barrier % | Shell % | Gardner Impact | | Izod Impact | | |
| Test No. | AN | MMA | in. lbs/ mil | % Ductile Breaks | in. lbs/ in. notch | HDT °C. | YI |
| --- | --- | --- | --- | --- | --- | --- | --- |
| 11 | 0 | 25 | 4.0 | 100 | 1.083 | 72.1 | 23.7 |
| 12 | 0 | 40 | 3.6 | 87 | 1.738 | 73.0 | 20.6 |
| 13 | 2 | 25 | 3.9 | 100 | 1.051 | 72.1 | 21.4 |
| 14 | 2 | 40 | 3.8 | 87 | 0.961 | 71.2 | 19.9 |
| Unmodified PVC | | | 0.9 | 0 | 0.476 | 71.0 | 7.4 |

EXAMPLE VII

This example shows the incorporation into polyvinyl chloride of core-shell composite polymers in which the core is SBR having either 45 or 55 weight percent of butadiene. The core-shell composite polymers were incorporated into polyvinyl chloride resin of the type described in Example V, in similar amounts. The results are shown in the following Table 3.

TABLE 3

| | Composition | | | | Properties in PVC | | | | |
| | Core | AN | Shell % | | Gardner Impact | | Izod Impact | | |
| Test No. | % BD | % | MMA | AMA | in. lbs/ mil | % Ductile Breaks | in. lbs/ in. notch | HDT °C. | YI |
| --- | --- | --- | --- | --- | --- | --- | --- | --- | --- |
| 15 | 45 | 0 | 40 | 0 | 3.6 | 11 | — | 71.3 | 23.3 |
| 16 | 45 | 2 | 40 | 0 | 3.6 | 29 | — | 72.8 | 27.7 |
| 17 | 45 | 5 | 40 | 0 | 3.2 | 100 | — | 72.1 | 26.6 |
| 18 | 45 | 0.5 | 25 | 0 | 3.5 | 43 | 0.713 | 72.3 | 36.9 |
| 19 | 55 | 1 | 25 | 0.1 | 3.2 | 43 | 1.351 | 72.9 | 26.2 |
| 20 | 55 | 1 | 25 | 0 | 3.4 | 100 | 1.547 | 71.7 | 28.6 |
| 21 | 45 | 1 | 25 | 0.1 | 3.3 | 75 | 0.839 | 72.7 | 30.9 |
| 22 | 55 | 0.5 | 25 | 0.1 | 3.4 | 100 | 1.624 | 72.3 | 22.5 |
| 23 | 45 | 0.5 | 25 | 0.1 | 3.6 | 100 | 1.033 | 72.1 | 32.7 |
| 24 | 45 | 1 | 25 | 0 | 3.5 | 89 | 0.847 | 72.6 | — |
| 25 | 55 | 0.5 | 25 | 0 | 3.1 | 100 | 1.148 | 71.7 | 26.8 |

TABLE 3-continued

| | Composition | | | | Properties in PVC | | | |
| | | | Shell | | Gardner Impact | | Izod Impact | | |
| Test No. | Core % BD | AN % | % MMA | AMA | in. lbs/ mil | % Ductile Breaks | in. lbs/ in. notch | HDT °C. | YI |
|---|---|---|---|---|---|---|---|---|---|
| Unmodified PVC Control: | | | | | 0.9 | 0 | 0.476 | 71.0 | 7.4 |

Abbreviation: BD = butadiene

EXAMPLE VIII

This Example reports the results of incorporating into polyvinyl chloride, core-shell composite polymers in which the polymeric cores are terpolymers of styrene, butadiene and methyl methacrylate. The core-shell polymers were prepared according to the method illustrated in Example IV and were incorporated into polyvinyl chloride resin in an amount of 12.5 parts of core-shell polymer according to the method of Example V. The results are shown in the following Table 4, in which the percentage of butadiene in all the core polymers was 70.

TABLE 4

| | Composition | | Properties in PVC | |
| | % MMA | Shell | Gardner Impact | |
| Test No. | in core | % MMA | in lbs/mil | % ductility |
|---|---|---|---|---|
| 26 | 10 | 47 | 3.6 | 86 |
| 27 | 5 | 42 | 3.56 | 100 |
| 28 | 0 | 25 | 2.62 | 89 |

The data shown in Tables 1, 2, 3 and 4 indicate clearly that the incorporation into polyvinyl chloride resin of core-shell composite polymers of the type described results in greatly improved impact strength. In many cases, they are equal to or better in impact strength than a commercial polyvinyl chloride modifier KM636 (Methacrylate/Butadiene/Styrene type acryloid modifier supplied by Rohm & Haas) used for comparison, and they do not cause any deterioration in other observed physical properties.

What is claimed is:

1. A polyvinyl chloride resin composition comprising (1) from about 60 to about 95 parts by weight of polyvinyl chloride and (2) from about 5 to about 40 parts by weight of a core-shell composite polymer, said core shell composite polymer being produced by a process consisting essentially of
   (a) providing, as the core polymer, an emulsion comprising discrete particles of (1) polybutadiene, (2) a copolymer of butadiene and styrene, or (3) a terpolymer of butadiene, styrene and from about 2 to about 12 weight percent of an alkyl methacrylate in which the alkyl has from 1 to 18 carbon atoms, in an aqueous medium containing a fast acting wetting agent selected from the group consisting of diisopropyl sulfosuccinate, and sodium or potassium salts of dioctyl-, dihexyl-, diisobutyl- and diisopropylsulfosuccinates;
   (b) adding to the emulsion, as a final outer shell-forming monomer, or monomer mixture selected from the group consisting of methylmethacrylate and methylmethacrylate with from about 0.01 to about 1% by weight of allylmethacrylate, in an amount sufficient to form, upon polymerization, a substantially complete surface shell around the core polymer, and
   (c) reacting the emulsion under conditions effective to polymerize the shell-forming monomer or monomer mixture, by precipitation polymerization on said core polymer surface,
   thereby forming discrete composite polymer core particles which are completely encapsulated by an integral outer surface shell of the polymerized shell-forming surface monomer or monomer mixture, which cure particles are free of the shell-forming homopolymer in at least the center thereof.

2. A composition according to claim 1 in which the core polymer additional includes a copolymerized unsaturated organic acid of 3 to 8 carbon atoms.

3. A composition according to claim 2 in which the acid is selected from the group consisting of itaconic acid, methacrylic acid and fumaric acid.

4. A composition according to claim 1 in which, in the process for producing the core-shell composite polymer, there is, prior to the step of adding the shell-forming monomer or monomer mixture, the additional step of adding from about 0.1 to 2.0 weight percent, based on the weight of the core polymer, of a barrier acrylic monomer selected from the group consisting of acrylonitrile and cyanoethylacrylate and reacting the emulsion under conditions effective to polymerize the acrylic monomer to form a barrier layer surrounding the polymer core particles.

5. The composition of claim 4 in which the acrylic monomer is acrylonitrile.

6. The composition according to claim 1 in which, the shell layer comprises from about 10 to about 60 weight percent of the composite polymer.

7. The composition according to claim 6 in which the shell layer comprises from about 20 to about 40 weight percent of the composite polymer.

8. A composition according to claim 1 in which the shell layer comprises about 25 weight percent of the composite polymer.

9. A composition according to claim 1 in which the core polymer consists essentially of particles of a copolymer of butadiene and styrene containing at least 45 weight percent of butadiene.

10. A composition according to claim 9 in which the copolymer contains at least 70 weight percent of butadiene.

11. A composition according to claim 1 in which the core polymer consists essentially of particles of polybutadiene.

12. A composition according to claim 1 in which the core polymer consists essentially of particles of a random terpolymer of butadiene, styrene and from 2 to 12 weight percent of an alkyl methacrylate in which the alkyl group has from 1 to 18 carbon atoms.

13. A composition according to claim 12 in which the alkyl methacrylate is present in an amount of from 4 to 10 weight percent.

14. A composition according to claim 12 in which the alkyl group is methyl.

15. A composition according to claim 1 wherein the outer shell is the monomer mixture.

16. A composition according to claim 1 wherein the outer shell is the methylmethacrylate monomer.

* * * * *